(12) United States Patent
Koegler et al.

(10) Patent No.: US 6,793,911 B2
(45) Date of Patent: Sep. 21, 2004

(54) NANOCRYSTALLINE INORGANIC BASED ZEOLITE AND METHOD FOR MAKING SAME

(75) Inventors: Johannes Hendrik Koegler, Heidelberg (DE); Chuen Y. Yeh, Edison, NJ (US); Philip J. Angevine, Woodbury, NJ (US)

(73) Assignee: ABB Lummus Global Inc., Bloomfield, NJ (US)

( * ) Notice: Subject to any disclaimer, the term of this patent is extended or adjusted under 35 U.S.C. 154(b) by 23 days.

(21) Appl. No.: 10/067,719

(22) Filed: Feb. 5, 2002

(65) Prior Publication Data

US 2003/0147805 A1 Aug. 7, 2003

(51) Int. Cl.$^7$ ............................................... C01B 29/24
(52) U.S. Cl. ................. 423/716; 423/DIG. 21
(58) Field of Search ................. 423/700, 716, 423/DIG. 21

(56) References Cited

U.S. PATENT DOCUMENTS

| | | | |
|---|---|---|---|
| 3,065,054 A | 11/1962 | Haden et al. | |
| 3,338,672 A | 8/1967 | Hayden, Jr. et al. | |
| 3,356,451 A | 12/1967 | Michalko | |
| 3,359,068 A | 12/1967 | Michalko | |
| 3,428,574 A | 2/1969 | Michalko | |
| 3,492,089 A | 1/1970 | Vesely | |
| 3,594,121 A | 7/1971 | Weber | |
| 3,777,006 A | * 12/1973 | Rundell et al. | 423/709 |
| 4,091,007 A | 5/1978 | Dwyer et al. | |
| 4,166,099 A | * 8/1979 | McDaniel et al. | 423/709 |
| 4,235,753 A | 11/1980 | Brown et al. | |
| 4,560,542 A | * 12/1985 | Robson | 423/703 |
| 4,562,055 A | 12/1985 | Arika et al. | |
| 4,603,040 A | 7/1986 | Kuznicki et al. | |
| 4,818,508 A | 4/1989 | Flank et al. | |
| 4,965,233 A | 10/1990 | Speronello | |
| 5,069,890 A | 12/1991 | Dai et al. | |
| 5,558,851 A | 9/1996 | Miller | |
| 5,785,944 A | 7/1998 | Miller | |
| 5,863,516 A | * 1/1999 | Otterstedt et al. | 423/700 |
| 6,004,527 A | 12/1999 | Murrell et al. | |
| 6,022,529 A | * 2/2000 | Rock et al. | 424/59 |
| 6,241,960 B1 | * 6/2001 | Tops.o slashed.e et al. | 423/700 |
| 6,565,826 B2 | * 5/2003 | Jacobsen et al. | 423/716 |

FOREIGN PATENT DOCUMENTS

| | | | |
|---|---|---|---|
| EP | 0 3121 983 A2 | 10/1988 | |
| EP | 0 299 430 A1 | 1/1989 | |
| EP | 0 311 983 B1 | 4/1989 | |
| EP | 436625 A * | 7/1991 | ........... C07H/15/12 |
| EP | 1 002 764 A1 | 5/2000 | |
| JP | 02116614 A * | 5/1990 | ........... C01B/33/34 |
| WO | WO 99/16709 | 4/1999 | |

* cited by examiner

Primary Examiner—David Sample
(74) Attorney, Agent, or Firm—Dilworth & Barrese, LLP

(57) ABSTRACT

A method for making a zeolite includes impregnating a porous inorganic oxide with a liquid solution containing an inorganic micropore-forming directing agent. The amount of liquid solution is no more than about 100% of the pore volume of the porous inorganic oxide, and the concentration of the directing agent in the liquid solution ranges from 21% to about 60% by weight. The impregnated amorphous inorganic oxide is heated at a synthesis temperature of from about 50° C. to about 150° C. for a duration of time sufficient to form a zeolite-containing product. The method herein is advantageous for the transformation of a mesoporous or macroporous amorphous inorganic material to a composite structure containing the original mesoporous or macropores, but wherein at least some of the porous inorganic oxide material is converted to nanocrystalline zeolite, such as zeolite Y.

21 Claims, 7 Drawing Sheets

NANOCRYSTALLINE INORGANIC BASED ZEOLITE AND METHOD FOR MAKING SAME

BACKGROUND

1. Field of the Invention

The present invention is related to a zeolite material having a nanocrystalline structure, and to a method for making same.

2. Background of the Art

Zeolites are porous crystalline materials characterized by submicroscopic channels of a particular size and/or configuration. Zeolites are typically composed of aluminosilicate, but have been made in a wide range of compositions. The channels, or pores are ordered and, as such, provide unique properties which make zeolites useful as catalysts or absorbents in industrial processes. For example, zeolites can be used for filtering out smaller molecules which become entrapped in the pores of the zeolite. Also, zeolites can function as shape selective catalysts which favor certain chemical conversions within the pores in accordance with the shape or size of the molecular reactants or products. Zeolites have also been useful for ion exchange, such as for water softening and selective recovery of heavy metals.

Synthetic zeolites are traditionally made from sources of silica and aluminum (silica and alumina "nutrients") that are reacted with each other, in the presence of materials that ensure highly alkaline conditions, such as water and $OH^-$. Other zeolites can be borosilicates, ferrosilicates, and the like. Many of the crystallization steps are conducted in the presence of an inorganic directing agent, or an organic template, which induces a specific zeolite structure that cannot easily be formed in the absence of the directing agent or template. Many of the organic templates are quaternary ammonium salts, but can also be linear amines, alcohols, and the like. As a hydroxide, some is directing agents introduce hydroxyl ions into the reaction system; however, the alkalinity is usually dictated by the amount of sodium hydroxide (NaOH), potassium hydroxide (KOH), etc. The reaction typically involves a liquid gel phase in which rearrangements and transitions occur, such that a redistribution occurs between the alumina and silica nutrients and molecular structures corresponding to specific zeolites are formed. Other metal oxides can also be included, such as titania-silica, boria-silica, etc. Some zeolites can only be made with organic templates. Other zeolites can only be made by means of an inorganic directing agent. Yet other zeolites can be made either by means of a hydrophilic (e.g., inorganic) directing agent or a hydrophobic (organic based) template.

Much of today's hydrocarbon processing technology is based on zeolite catalysts. Various zeolite catalysts are known in the art and possess well-arranged pore systems with uniform pore sizes. The term "medium pore" as applied to zeolites usually refers to zeolite structures having a pore size of 4–6 angstrom units (Å). "Large pore" zeolites include structures having a pore size of above 6 to about 12 Å.

Because such hydrocarbon processing reactions are limited by mass-transfer (specifically, intraparticle diffusion), a catalyst with ideal pore size will facilitate transport of the reactants to active catalyst sites and transport of the products out of the catalyst, but still achieve the desired shape selective catalysis. Zeolite morphology, i.e., crystal size, is another parameter in diffusion limited reactions.

U.S. Pat. No. 6,004,527, which is herein incorporated by reference in its entirety, discloses a hydrothermal method for synthesizing large pore zeolites from an amorphous framework structure. The method produces a molecular sieve in-situ which is incorporated in the large pore framework morphology of the amorphous starting material. However, the method described therein requires a long period of time for the synthesis. It would be advantageous to have a convenient, less time-consuming method for producing a similar product.

SUMMARY

A method is provided herein for making a molecular sieve. The method comprises the steps of: (a) providing a porous inorganic oxide; (b) impregnating the porous inorganic oxide with a liquid solution containing a micropore-forming directing agent, wherein the amount of liquid solution is no more than about 100% of the pore volume of the porous inorganic oxide, and the concentration of the directing agent in the liquid solution ranges from about 21% to about 60% by weight; and, (c) heating the impregnated porous inorganic oxide at an elevated synthesis temperature (i.e., above room temperature) for a duration of time sufficient to form a zeolite-containing product. The preferred product is a zeolite such as zeolite Y.

The method herein advantageously produces zeolite having a nanocrystalline (i.e., a crystal size of no more than about 100 nm) structure in a relative short synthesis time. While the porous inorganic oxide is usually amorphous, it can alternatively be partially or fully crystalline.

BRIEF DESCRIPTION OF THE DRAWINGS

Various embodiments are described below with reference to the drawings wherein.

DETAILED DESCRIPTION OF PREFERRED EMBODIMENT(S)

The method described herein transforms a porous inorganic oxide material to a zeolite material while retaining the gross framework morphology of the original material. The initial inorganic oxide can be any material containing silicon, oxygen, and atoms selected from aluminum, boron, titanium, iron, zirconium, gallium, germanium, arsenic, or combinations thereof. Silica-alumina materials are typical, and, for the purpose of illustration, the method is described herein in terms of silicon-aluminum-oxygen combinations, although other metal-oxygen combinations are also considered to be within the scope of the present invention. Although the silica-alumina starting material is often in the form of a powder, pre-shaped particles (for example, in the forms of spheres, granules, or extrudates) are also applicable.

Figure 1:
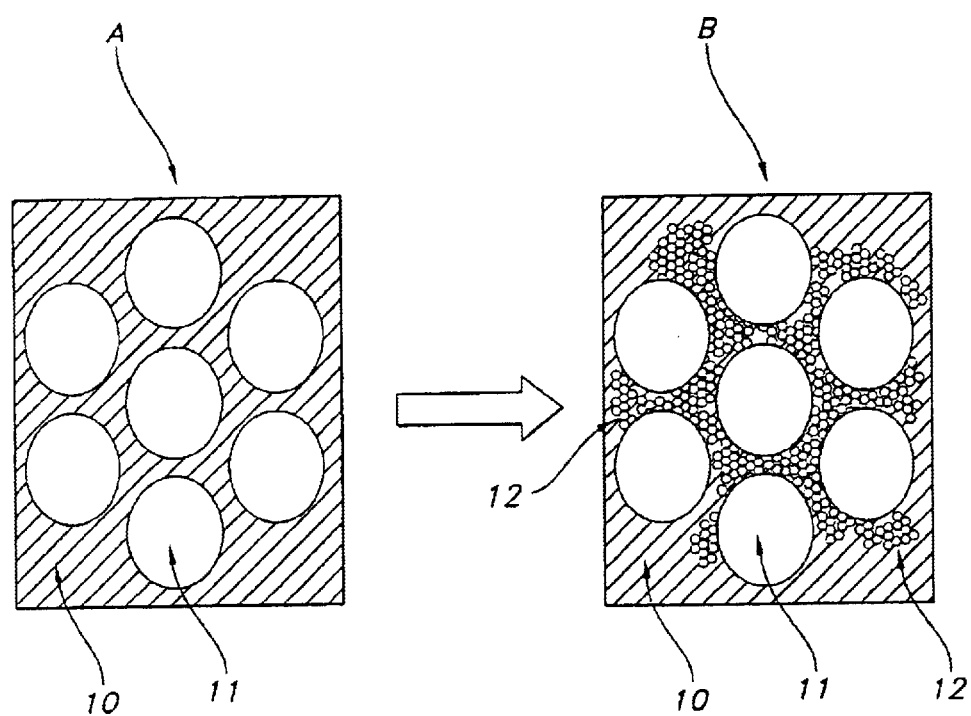
FIG. 1 is an illustration diagram of the conversion of a porous material in accordance with the method described herein.

Referring to FIG. 1, structure A is an amorphous silica-alumina which has a porous structure 10⁴ including mesopores and/or macropores 11 having a pore size of from about 2 nm to about 50 nm (mesopores) or above 50 nm (macropores). The method described herein converts structure A to structure B, which retains the overall framework morphology of the original porous structure, but also has at least some of the silica-alumina constituting the walls of structure 10 converted to zeolite 12 with an ultra-small crystal size, i.e., no more than about 100 nm in ultimate crystal size. Materials of this size are referred to as "nanocrystalline materials."

The product zeolite with ultra-small, or nanocrystalline, crystal size possesses several advantages in connection with certain hydrocarbon conversion processes. For example, the effective diffusivity of many reactants and products is increased. Secondly, the product selectivity is enhanced for certain processes, especially sequential reactions, where an intermediate product is desired. For example, ultra-small crystal size can reduce the amount of (1) over-cracking (e.g., the production of $C_3/C_4$ light gas products from the cracking of vacuum gas oil wherein distillate and naphtha products are the desired products) and (2) unwanted polyalkylation in aromatic alkylation processes. Also, coking, and the associated catalyst deactivation, is reduced for nanocrystalline zeolites by enabling the coke precursors to leave the catalyst before undergoing retrogressive condensation reactions.

The method is described below in connection primarily with the preparation of zeolite Y, although the preparation of other zeolites (e.g., zeolites A, F, rho, and X, as well as mordenite and ZSM-5) is also within the scope of the present invention. Zeolite Y produced in accordance with the present method has a cubic faujasite structure with an effective pore diameter of about 7 Å to 8 Å and a unit cell size of less than 25 Å. The zeolite Y also preferably has a silica to alumina mole ratio of less than about 10, preferably less than about 6.

While the invention can be applied to crystallization in the presence of an organic template, the most pronounced crystal effect is observed for inorganic systems.

Nanocrystalline zeolite Y is useful in various hydrocarbon conversion processes, such as: alkylation and transalkylation in the production of ethylbenzene or cumene, alkylation of olefins with paraffins for the production of high octane gasoline, hydrocracking of vacuum gas oil to produce transportation fuels, hydroprocessing for making lube base stocks, preparation of linear alkylbenzenes or alkylnaphthalenes, selective hydrogenation, aromatic nitration, etc.

The present method can advantageously produce zeolite Y in far less time than the method described in U.S. Pat. No. 6,004,527.

The method of the present invention includes impregnating a porous silica-alumina with a concentrated aqueous solution of an inorganic micropore-forming directing agent through incipient wetness impregnation. The porous silica-alumina can be amorphous or crystalline. The amount of liquid is less than the amount of liquid which would cause surface gelation visible to the naked eye. The reaction appears to be "dry" because the liquid provided to the reaction is absorbed into and wets the interior voids of the porous silica-alumina inorganic oxide, but does not form a paste. The liquid includes water, inorganic micropore-forming directing agent, and also, if necessary, an organic template. The inorganic micropore-forming directing agent can be an alkali metal base or an alkaline earth metal base.

The organic template is selected in accordance with the desired product. Typical organic templates useful in zeolite synthesis include quaternary ammonium salts, linear amines and diamines, and alcohols. More specifically, particular organic templates include tetramethyl ammonium hydroxide or salts thereof, tetraethyl ammonium hydroxide or salts thereof, tetrapropyl ammonium hydroxide or salts thereof, pyrrolidine, hexane-1,6-diamine, hexane-1-6-diol, piperazine, and 18-crown-6 ethers.

With respect to the preparation of zeolite Y, suitable inorganic micropore-forming directing agents include alkali metal hydroxides such as potassium hydroxide (KOH) or, more preferably, sodium hydroxide (NaOH). No organic templates are used. Since a high pH favors zeolite Y as well as rapid crystallization, high concentrations of directing agent are required. For example, when using concentration of 20% (by weight) or less of NaOH, other crystal phases such as cancrinite or zeolite P are formed, or no conversion might take place, or the conversion might take an unacceptably long period of time. Referring to Examples 9 and 10 of U.S. Pat. No. 6,004,527, for example, it can be seen that reaction times of 16 hours (Example 9) or 22 hours (Example 10) are typically required for the formation of zeolite Y.

It has surprisingly been found that higher concentrations of inorganic directing agent significantly reduce the necessary reaction time. A preferred range of NaOH concentration in aqueous solution is 21% to about 60% by weight, more preferred is an NaOH concentration of 25% to about 55% by weight. Most preferred is an NaOH concentration of 45% to 50% by weight. Since higher NaOH concentrations result in exceedingly high viscosity and incomplete internal wetting, the intermediate concentration range represents an optimal level.

To maintain a "dry" reaction the amount of inorganic directing agent solution should not exceed 100% of the pore volume of the porous inorganic oxide material, and preferably ranges from about 80% to about 100% of the pore volume.

The degree of uniformity of the impregnation is important for successful crystallization of zeolite Y. Localized non-uniformity can result in non-zeolite Y by-product formation. To provide suitable mixing on a small scale (e.g., in the range of several grams to 100grams) a mortar can be used to mix the silica-alumina with the solution of the micropore-forming directing agent. On a larger scale, a mixer in combination with a sprayer can be used.

The synthesis mixture of combined porous/amorphous silica-alumina and directing agent (NaOH) is then placed in a heating medium and heated to an elevated temperature of from about 50° C. to about 150° C., more preferably from about 70° C. to about 110° C. Rapid heating of the synthesis mixture is desired to preclude the formation of large zeolite crystals. This requirement is counterintuitive to most zeolite crystallization procedures, which teach the principle that low temperature is required for small crystal size. To maintain the synthesis of zeolite Y crystals of no more than about 100 nm, the mass of synthesis mixture should be raised to the synthesis temperature within about 3,600 seconds (i.e., 1 hour), preferably within about 120 seconds.

The synthesis mixture is maintained at the synthesis temperature for a time period sufficient to convert a sufficient amount of the silica-alumina to zeolite Y. The final framework structure after crystallization contains a substantial crystalline content (by weight), typically at least 15%, preferably at least 50% and most preferably from about 75% to 100% zeolite. The period of synthesis time can depend upon the synthesis temperature, lower synthesis temperatures requiring longer synthesis times. Synthesis time can range from 5 minutes to 50 hour, but more typically from 10 minutes to 48 hour, and preferably from about 15 minutes to about 5 hour.

After the required synthesis time the reaction should be quenched by active cooling. The micropore-forming directing agent should be removed from the product.

The following Examples illustrate various aspects of the procedures described herein.

EXAMPLE 1

Figure 2:
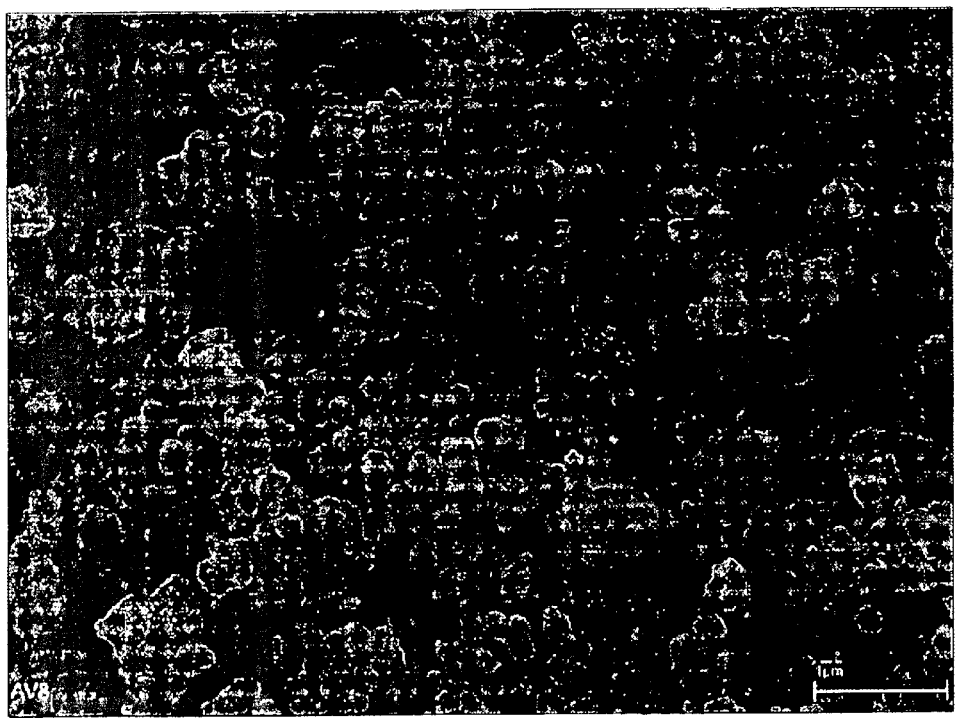
FIG. 2 is a scanning electron micrograph ("SEM") of the crystalline material produced in Example 1.

One part of porous silica-alumina with a silica to alumina molar ratio ("SAR") of 5.1 was impregnated with 1.05 parts of a solution containing 45 parts by weight of NaOH and 55 parts distilled water. The impregnated material was placed in a metal autoclave container 8 mm in diameter and 60 mm in height having a thin 0.5 mm fluorocarbon (Teflon®) lining. The autoclave was filled to about 50% of its volume. The autoclave container was introduced into an aluminum block which was preheated to the reaction temperature of 70° C. After heating for 30 hour, the product was taken out of the autoclave container, washed twice with water and then dried at 120° C. The dried product possessed 99% zeolite Y crystals having sizes of 35 to 100 nm. FIG. 2 is a micrograph of the zeolite Y crystals produced by scanning electron microscopy ("SEM").

EXAMPLE 2

Figure 3:
FIG. 3 is a SEM of the crystalline material produced in Example 2.

One part of porous silica-alumina with a SAR of 5.1 was impregnated with 1.12 parts of a solution containing 50 parts by weight of NaOH and 50 parts distilled water. The impregnated material was placed in a metal autoclave container 8 mm in diameter and 60 mm in height having a thin 0.5 mm fluorocarbon (Teflon®) lining. The autoclave was filled to about 50% of its volume. The autoclave container was introduced into an aluminum block which was preheated to the reaction temperature of 100° C. After heating for 30 minutes, the product was taken out of the autoclave container, washed twice with water and then dried at 120° C. The dried product possessed 96% zeolite Y crystals having sizes of 25 to 100 nm. FIG. 3 is a SEM of the zeolite Y crystals of this Example.

EXAMPLE 3

Figure 4:
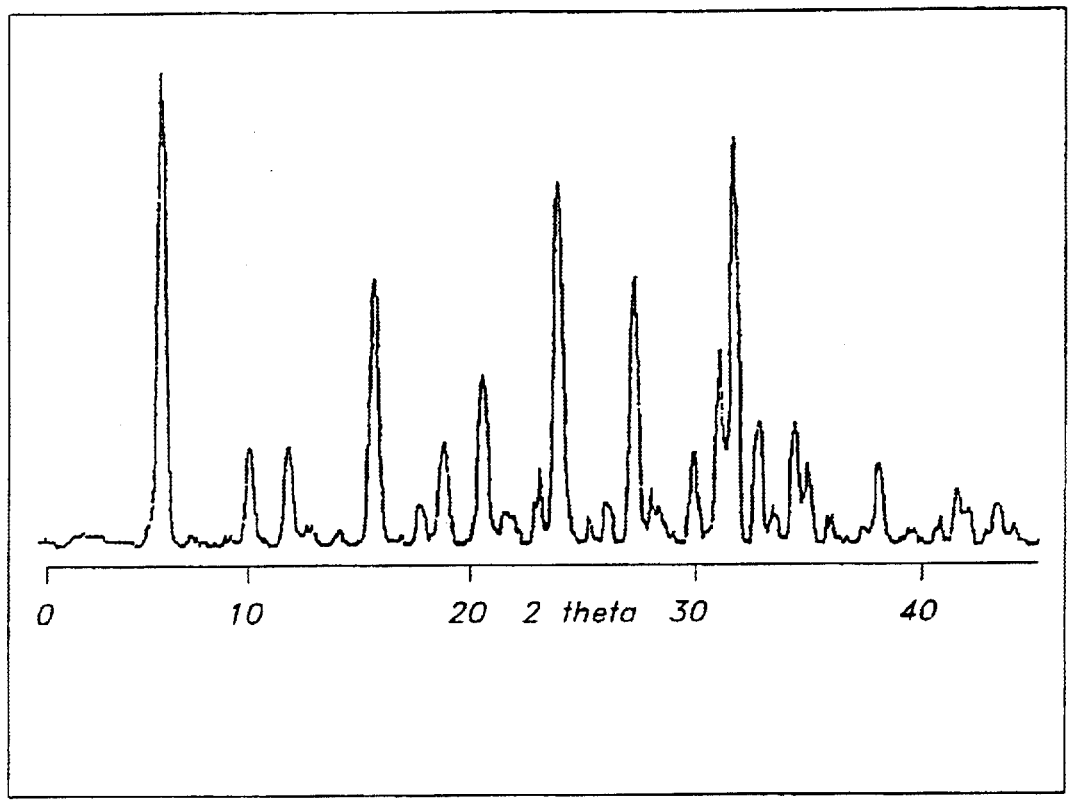
FIG. 4 is an X-ray diffraction pattern of the crystalline material produced in Example 3.
Figure 5:
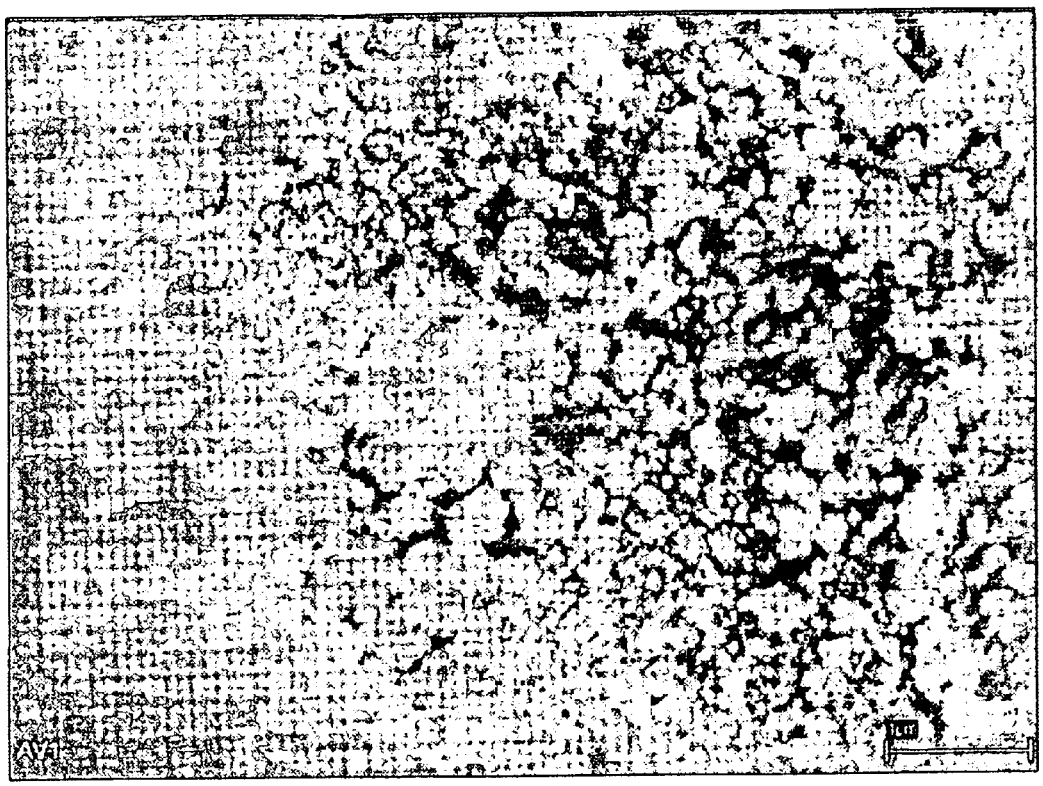
FIG. 5 is a SEM of the crystalline material produced in Example 3.

One part of porous silica-alumina with a SAR of 5.1 was impregnated with 1.05 parts of a solution containing 45 parts by weight of NaOH and 55 parts distilled water. The impregnated material was placed in a metal autoclave container 8 mm in diameter and 60 mm in height having a thin 0.5 mm fluorocarbon (Teflon®) lining. The autoclave was filled to about 50% of its volume. The autoclave container was introduced into an aluminum block which was preheated to the reaction temperature of 100° C. After heating for 15 minutes, the product was taken out of the autoclave container, washed twice with water and then dried at 120° C. The dried product possessed. 99% zeolite Y crystals having sizes of 25 to 100 nm. FIG. 4 is an X-ray diffraction pattern of the product of this Example. FIG. 5 is a SEM of the zeolite Y crystals of this Example.

EXAMPLE 4

One part of porous silica-alumina with a SAR of 5.1 was impregnated with 1.05 parts of a solution containing 45 parts by weight of NaOH and 55 parts distilled water. The impregnated material was placed in a 45 ml metal Parr autoclave container 27 mm in diameter and 80 mm in height having a 5.0 mm fluorocarbon (Teflon®) lining. The autoclave was preheated to 100° C. and filled to less than 5% of its volume. The autoclave container was introduced into a hot air oven, which was preheated to the reaction temperature of 100° C. After heating for 15 minutes, the product was taken out of the autoclave container, washed twice with water and then dried at 120° C. The dried product exhibited no crystallinity, which indicated that no measurable conversion had taken.

EXAMPLE 5

Figure 6:
FIG. 6 is a SEM of the crystalline material produced in Example 5.

The same procedure was used as in Example 4, but the residence time in the hot-air oven was 5 hour. The dried product exhibited a crystallinity of 17% zeolite Y having a crystal size range of from about 100 nm to about 500 nm. FIG. 6 is a SEM of the product obtained in this Example.

EXAMPLE 6

Figure 7:
FIG. 7 is a SEM of the crystalline material produced in Example 6.

The same procedure was used as in Example 4, but the residence time in the hot-air oven was 7 hour. The dried product exhibited a crystallinity of 97% zeolite Y having a crystal size range of from about 100 nm to about 500 nm. FIG. 7 is a SEM of the product of this Example.

The above Examples show that the best results were obtained by using an aluminum block heating method which, with the relatively thin (0.5 mm) fluorocarbon lining of the autoclave, permitted a rapid heating of the synthesis material to the synthesis temperature in from 1 to 2 minutes (i.e., less than 120 seconds). The result was a short duration of synthesis time (Examples 2 and 3) and zeolite Y product having a crystal size of no more than 100 nm. Examples 5 and 6 employed a hot air oven and a relatively thick (5.0 mm) fluorocarbon lining on the autoclave container. The insulation effect of the thick liner resulted in a longer period of time to reach synthesis temperature, i.e., more than 60 minutes. The synthesis times were longer and the resulting crystal size range was larger. Example 4 was performed in the same manner as Examples 5 and 6, but the duration of heating time (15 minutes) in conjunction with the use of the slower heating hot air oven was insufficient to achieve a significant degree of conversion.

While the above description contains many specifics, these specifics should not be construed as limitations on the scope of the invention, but merely as exemplifications of preferred embodiments thereof. Those skilled in the art will envision many other possibilities within the scope and spirit of the invention as defined by the claims appended hereto.

What is claimed is:

1. A method for making a zeolite, comprising the steps of:
   a) providing a porous inorganic oxide;
   b) impregnating said porous inorganic oxide with a liquid solution containing a micropore-forming directing agent, wherein the amount of liquid solution is no more than about 100% of the pore volume of the inorganic oxide, and the concentration of the micropore-forming directing agent in the liquid solution ranges from about 25% to about 60% by weight; and,
   c) heating the impregnated porous inorganic oxide at an elevated synthesis temperature for a duration of time sufficient to form a zeolite-containing product wherein the porous inorganic oxide is raised to the elevated synthesis temperature in a period of time less than about 3,600 seconds.

2. The method of claim 1 further including the steps of washing and then drying the zeolite-containing product.

3. The method of claim 1 wherein in the heating step (c) the impregnated porous inorganic oxide is raised to the synthesis temperature in a period of time short enough to preclude the formation of zeolite crystals larger than about 100 nm in size.

4. The method of claim 3 wherein the zeolite in the product has a crystal size of from about 25 to about 100 nm.

5. The method of claim 4 wherein the zeolite is zeolite Y.

6. The method of claim 1 wherein the period of time in which the porous inorganic oxide is raised to the elevated synthesis temperature is less than about 120 seconds.

7. The method of claim 1 wherein the liquid solution is an aqueous solution.

8. The method of claim 1 wherein the inorganic micropore-forming directing agent is an alkali metal hydroxide or an alkaline earth metal hydroxide.

9. The method of 8 wherein the micropore-forming directing agent is sodium hydroxide.

10. The method of claim 1 wherein the concentration of inorganic micropore-forming directing agent ranges from about 25% to about 55% by weight.

11. The method of claim 1 wherein the concentration of inorganic micropore-forming directing agent ranges from about 40% to about 50% by weight.

12. The method of claim 1 wherein substantially no organic directing agent is present.

13. The method of claim 1 wherein the synthesis temperature ranges from about 50° C. to about 150° C.

14. The method of claim 13 wherein the zeolite-containing product is a composite structure retaining the framework morphology of the porous inorganic oxide but wherein at least some of the porous inorganic oxide is converted to crystalline material.

15. The method of claim 1 wherein the synthesis temperature ranges from about 70° C. to about 110° C.

16. The method of claim 1 wherein the porous inorganic oxide is a silicon-aluminum-oxygen containing compound.

17. The method of claim 1 wherein the porous inorganic oxide has a structure having mesopores and/or macropores.

18. A method for making a nanocrystalline zeolite comprising:
   a) providing an porous aluminosilicate material having a structure including mesopores and/or macropores;
   b) impregnating the aluminosilicate material with an aqueous solution containing from about 25% to about 55% by weight of sodium hydroxide, wherein the amount of aqueous solution is from about 80% to 100% of the pore volume of the aluminosilicate material; and,
   c) heating the impregnated aluminosilicate to an elevated synthesis temperature for a duration of time ranging from about 15 minutes to 5 hour to produce a product containing at least 76% zeolite with a crystal size less than 100 nm.

19. The method of claim 18 wherein the product is a composite structure retaining the structure of the porous aluminosilicate but wherein at least some of the amorphous aluminosilicate is converted to the zeolite.

20. The method of claim 19 wherein the zeolite is zeolite Y.

21. The method of claim 20 wherein the zeolite Y has a crystal size of less than 100 nm and a pore size of from 7 Å to about 8 Å.

* * * * *